(No Model.)
G. E. RAYMOND.
COFFEE OR TEA POT.
No. 402,969. Patented May 7, 1889.
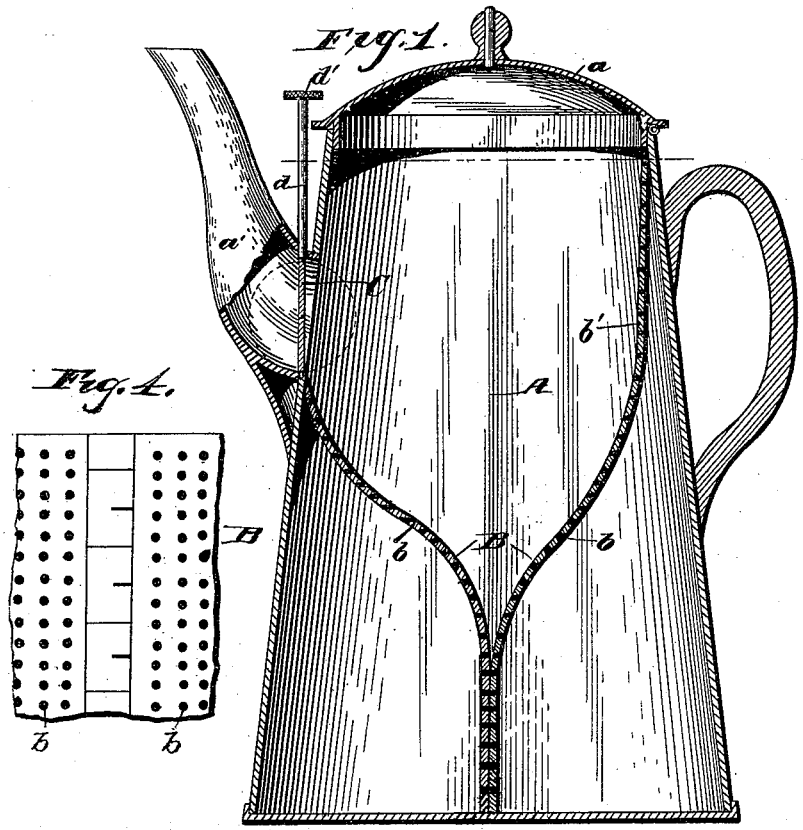
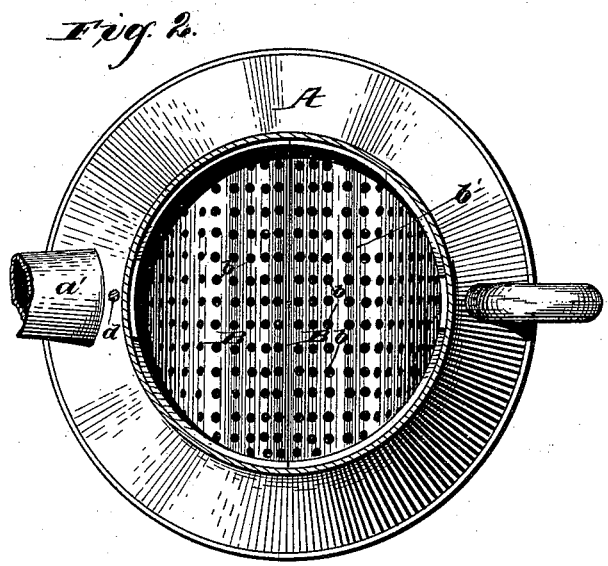
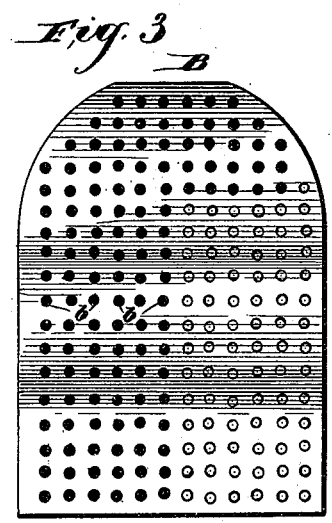
WITNESSES
M. H. Pumphrey.
Frank X. Quinlan.
INVENTOR,
George E. Raymond
By Myers & Co.
Attorneys.

UNITED STATES PATENT OFFICE.

GEORGE EDWARD RAYMOND, OF CHICAGO, ILLINOIS.

COFFEE OR TEA POT.

SPECIFICATION forming part of Letters Patent No. 402,969, dated May 7, 1889.

Application filed June 28, 1888. Serial No. 278,408. (No model.)

*To all whom it may concern:*

Be it known that I, GEORGE EDWARD RAYMOND, a citizen of the United States of America, residing at Chicago, in the county of Cook and State of Illinois, have invented certain new and useful Improvements in Coffee or Tea Pots, of which the following is a specification, reference being had therein to the accompanying drawings.

This invention pertains to certain new and useful improvements in tea-pots, having for its object the provision of simple and efficient means whereby the aroma will be thoroughly extracted from the tea and the leaves will be prevented from flowing from the pot.

The invention comprises the detail construction and arrangement substantially as hereinafter fully set forth, and particularly pointed out in the claim.

In the accompanying drawings, Figure 1 is a vertical sectional view of my improved tea-pot. Fig. 2 is a horizontal sectional view thereof. Fig. 3 is a detail view. Fig. 4 is a view of a portion of the division-plate, showing a scale thereon.

Referring to the drawings, A designates the tea-pot or receptacle provided with the ordinary lid or cover, $a$, and spout $a'$, as shown.

B is an approximately V-shaped perforated division-plate, the outer lower portion of the vertex of which is designed to rest upon the bottom of the pot. This V-shaped division-plate is provided with holes or apertures $b$ throughout its surface to permit of the passage therethrough of the tea or water. The upper end of the rear portion, $b'$, of this division-plate extends to the upper end of the pot beneath the lid or cover, while the same end of the front portion extends to the inner end of the spout $a'$, as shown. By making this division-plate B of approximately V shape the same will support itself within the pot free of all means of support save the pot itself.

To serve as a guide for the person using the tea-pot, I preferably stamp or impress on the perforated division-plate B in some suitable manner the number of cups of water the pot is capable of holding, as shown in Fig. 4. By this means a guide is established for the person using my tea-pot and the danger of making the tea too strong or too weak is avoided. The number stamped on each division-plate varies according to the size of the tea-pot.

C is a cut-off or gate located at the inner end of the spout $a'$, and is provided with an upwardly-projecting spindle, $d$, extending through an aperture in the spout. This spindle has a milled head or small wheel, $d'$, which the operator grasps in effecting the turning of said cut-off or gate. This cut-off or gate is designed to prevent the escape of steam during the boiling operation, and thereby retain within the pot all aroma, whereby a strong and perfect extraction is had from the tea-leaves.

In practice the tea-leaves are first placed on the bottom of the pot A, and the apertured division plate or partition is then placed in position, and the cut-off or gate is turned so as to close the end of the spout. The water placed within the pot is thus permitted to have free access to the leaves, and while the same are steeping or being "drawn" the steam is confined in said pot, thus retaining all aroma of the tea, and securing a perfect extraction from the leaves. When the tea proper is to be drawn or poured from the pot, the cut-off or gate is turned, and the same passes therefrom free of all leaves, which are kept from passing out with the tea by means of the perforated division plate or partition, thus remedying the objection of the leaves passing out with the tea, as occurs with the forms of tea-pots now in use.

The perforated plate or partition is preferably made of the same material (earthenware or porcelain) as the tea-pot.

It will be seen that my invention is extremely simple, that it presents a unique and useful device, and that it embodies advantages in point of durability, general efficiency, and inexpensiveness.

I claim as my invention—

As an improvement in tea-pots, the approximately V-shaped division-plate having its vertex resting on the bottom of the pot, its rear portion extending to the upper end of said pot, and the front portion to the inner end of the spout, substantially as shown and described.

In testimony whereof I affix my signature in presence of two witnesses.

GEORGE EDWARD RAYMOND.

Witnesses:
BELLE M. EICHRODT,
ALEXANDER C. AYRES.